United States Patent
Aftanas et al.

(10) Patent No.: US 8,235,264 B2
(45) Date of Patent: *Aug. 7, 2012

(54) SYSTEM AND METHOD FOR VEHICLE ARTICLE CARRIER HAVING STOWABLE CROSS BARS

(75) Inventors: Jeffrey M. Aftanas, Ortonville, MI (US); Conde M. Gonzalez, Utica, MI (US); Michael Makin, Pontiac, MI (US); Gordon Michie, LaSalle (CA); Gerard J. Kmita, Allen Park, MI (US)

(73) Assignee: JAC Products, Inc., Saline, MI (US)

( * ) Notice: Subject to any disclaimer, the term of this patent is extended or adjusted under 35 U.S.C. 154(b) by 421 days.

This patent is subject to a terminal disclaimer.

(21) Appl. No.: 12/637,907

(22) Filed: Dec. 15, 2009

(65) Prior Publication Data

US 2010/0320244 A1 Dec. 23, 2010

Related U.S. Application Data

(63) Continuation-in-part of application No. 12/243,260, filed on Oct. 1, 2008, now Pat. No. 8,096,454.

(51) Int. Cl.
 *B60R 9/045* (2006.01)
(52) U.S. Cl. ........................................ 224/321
(58) Field of Classification Search ................... 224/321
 See application file for complete search history.

(56) References Cited

U.S. PATENT DOCUMENTS

| 3,165,353 | A | * | 1/1965 | Weise | 296/210 |
| 4,294,388 | A | | 10/1981 | Wünstel | |
| 4,416,406 | A | * | 11/1983 | Popeney | 224/314 |
| 5,071,050 | A | | 12/1991 | Pudney et al. | |
| 5,377,890 | A | | 1/1995 | Brunner et al. | |
| 5,657,914 | A | | 8/1997 | Stapleton | |
| 7,458,490 | B2 | * | 12/2008 | Klinkman et al. | 224/321 |
| 7,926,686 | B2 | * | 4/2011 | Salvador et al. | 224/321 |
| 8,028,875 | B2 | * | 10/2011 | Kmita et al. | 224/321 |
| 8,096,454 | B2 | * | 1/2012 | Aftanas et al. | 224/321 |
| 2006/0163297 | A1 | * | 7/2006 | Moreau | 224/321 |
| 2008/0290123 | A1 | * | 11/2008 | Sprague | 224/321 |
| 2010/0327032 | A1 | * | 12/2010 | Aftanas | 224/315 |

* cited by examiner

Primary Examiner — Justin Larson
(74) Attorney, Agent, or Firm — Harness, Dickey & Pierce, P.L.C.

(57) ABSTRACT

A vehicle article carrier system is adapted to be secured to an outer body surface of a vehicle. The system may include a pair of support rails secured to the outer body surface and at least one cross bar. The cross bar may have end supports that are able to pivot. The end supports may be secured to the support rails to place the cross bars in an operative position extending generally perpendicularly between the support rails, and elevationally above the support rails. The end supports may also enable the cross bar to be placed in a stowed position along the slats where each of the end supports lay generally co-linear with a central portion its respective cross bar.

23 Claims, 12 Drawing Sheets

SYSTEM AND METHOD FOR VEHICLE ARTICLE CARRIER HAVING STOWABLE CROSS BARS

CROSS-REFERENCE TO RELATED APPLICATIONS

This application is a continuation-in-part of U.S. patent application Ser. No. 12/243,260, filed Oct. 1, 2008. The entire disclosure of the above application is incorporated herein by reference.

FIELD

The present disclosure relates to vehicle article carrier systems, and more particularly to a vehicle article carrier system and method having stowable cross bars that can be stowed in a compact, generally hidden manner when not in use.

BACKGROUND

The statements in this section merely provide background information related to the present disclosure and may not constitute prior art.

Vehicle article carrier systems are used on a wide variety of motor vehicles to transport objects above an outer surface of a vehicle. Typically such vehicle article carriers are secured on an outer body surface of a vehicle, for example such as on a roof of the vehicle. A vehicle article carrier often includes one, but more typically two, cross bars that are supported on support rails, where the support rails are fixedly secured to the roof of the vehicle. The cross bars are supported on the support rails so that they extend laterally (i.e., width-wise) above the outer body surface of the vehicle between the two support rails. The cross bars are thus supported above the outer body surface and used to support articles thereon, typically with the assistance of cargo straps such as bungee cords, rubber cords or nylon cords.

While such vehicle article carriers are highly useful for transporting articles thereon, the cross bars do typically add a small degree of wind resistance as the vehicle travels. With the present day emphasis on maximizing fuel economy of vehicles of all types, there is an increased interest in providing a vehicle article carrier construction which can eliminate the wind resistance of the cross bars when the cross bars are not needed. To this end many vehicle article carriers incorporate cross bars that can be removed, although removal can sometimes require special tools and somewhat time consuming procedures. If removed, then the cross bars need to be stored somewhere. Since the cross bars typically have a length which is close to the overall width of the outer body surface of the vehicle (i.e., the roof portion), the cross bars are not always easily stored inside the vehicle. Even if they are able to be stored inside the vehicle, they may use up a considerable amount of otherwise available cargo space inside the vehicle or otherwise interfere with the full use of the available cargo space within the vehicle. Storing the cross bars off of the vehicle, such as in one's garage, is an option, but then that gives rise to the possibility that an unanticipated need may arise to use the vehicle article carrier, and the user may not have the cross bars with him/her in the vehicle.

SUMMARY

In one aspect the present disclosure relates to a vehicle article carrier system for use on an outer body surface of a vehicle to removably support articles above the outer body surface. The system may comprise: a pair of support rails secured to the outer body surface generally parallel to one another, and extending along a major longitudinal axis of the vehicle; the support rails each including a first attachment point and a pair of second attachment points; at least one cross bar having dimensions sufficient to extend between the support rails when the support rails are secured to the outer body surface of the vehicle. The cross bar may have: a central portion; a pair of end supports at opposite ends of the central portion; each said end support being hingedly secured to its respective end of the central portion and moveable between a first position substantially parallel with the central portion, and a second position extending non-parallel to the central portion; each said end support including an attachment component adapted to engage with the first attachment points of the support rails when the cross bar is in an operative position extending generally perpendicularly between the support rails; and the attachment components of the cross bar adapted to engage with the pair of second attachment points on one of the support rails when in a non-operative position so as to be stowed closely against and generally parallel to the one support rail.

In another aspect the present disclosure relates to a vehicle article carrier system for use on an outer body surface of a vehicle to removably support articles above the outer body surface, the system comprising: a pair of support rails secured to the outer body surface generally parallel to one another, and extending along a major longitudinal axis of the vehicle; the support rails each including a first attachment point and a pair of second attachment points; at least one cross bar having dimensions sufficient to extend between the support rails when the support rails are secured to the outer body surface of the vehicle. The cross bar may have: a central portion; a pair of end supports at opposite ends of the central portion; each said end support being hingedly secured to its respective end of the central portion and moveable between a first position substantially parallel with the central portion, and a second position extending non-parallel to the central portion; each said end support including an attachment component adapted to engage with the first attachment points of the support rails when the cross bar is in an operative position extending generally perpendicularly between the support rails, the end supports further extending at an angle of between about 30 degrees to about 90 degrees when the cross bar is positioned in the operative position; and the attachment components of the cross bar adapted to engage with the pair of second attachment points on one of the support rails when in a non-operative position so as to be stowed closely against and generally parallel to the one support rail, and the end supports being generally coplanar with the central portion of the cross bar when the cross bar is in the non-operative position.

In still another aspect the present disclosure relates to a vehicle article carrier system for use on an outer body surface of a vehicle to removably support articles above the outer body surface. The system may comprise: a pair of support rails secured to the outer body surface generally parallel to one another, and extending along a major longitudinal axis of the vehicle; the support rails each including a first attachment point and a pair of second attachment points; at least one cross bar having dimensions sufficient to extend between the support rails when the support rails are secured to the outer body surface of the vehicle; the cross bar having a central portion, a pair of end supports at opposite ends of the central portion, and each said end support including an attachment component adapted to engage with any of the first and second attachment points; each said end support being hingedly secured to its respective end of the central portion and moveable so as to position the central portion of the cross bar at an elevated position above the support rails when the attachment components are secured to the first attachment points of said pair of support rails, such that the cross bar is in an operative position; and each said attachment component of each said end support being securable to the second attachment points of one of the support rails to place the central portion and the end supports generally flush against said one support rail in a stowed, non-operative position when the cross bar is not needed for use.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
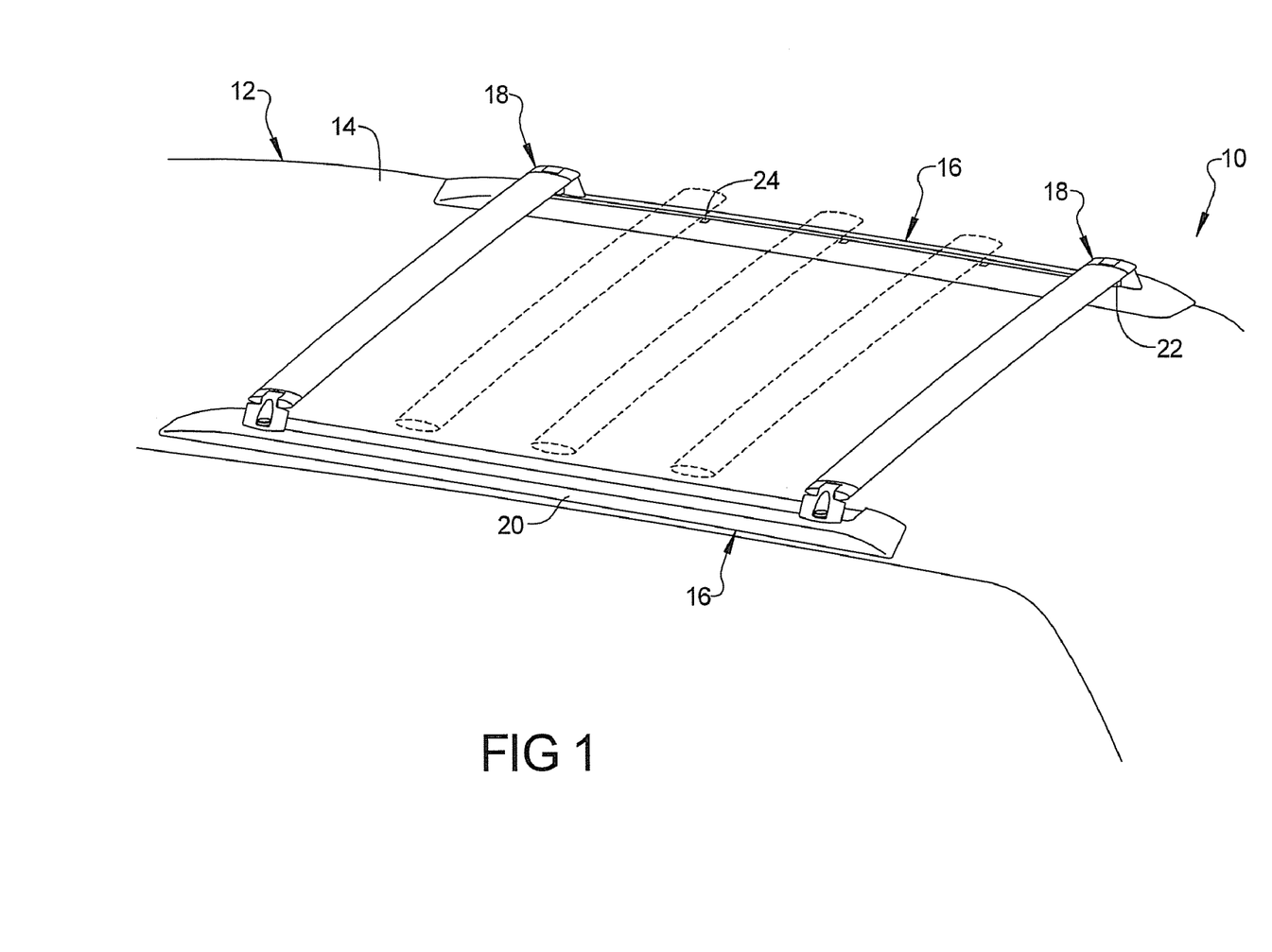
FIG. 1 is a perspective view of a portion of a vehicle illustrating one embodiment of a vehicle article carrier of the present disclosure mounted on an outer body surface of the vehicle, with the cross bars of the vehicle article carrier each being mounted in an operative position.

Referring to FIG. 1, there is vehicle article carrier system 10 supported on an outer body surface 14 of a vehicle 12. The vehicle 12 may comprise a car or sports utility vehicle (SUV), van, minivan or any other form of vehicle where it is desired to be able to support articles above its outer body surface. The system 10 may include a pair of support rails 16 that are fixedly secured to the outer body surface 14 generally parallel to one another, and extending generally parallel to a major longitudinal axis of the vehicle outer body surface 14. At least one, and more preferably a pair, of cross bars 18 are secured to the support rails 16. As will be explained more fully in the following paragraphs, it is a principal advantage of the system 10 that the cross bars 18 may be supported (or "stowed") in a substantially hidden, highly aerodynamic manner when not in use, but are able to be positioned above the support rails 16 quickly and easily when needed for use. Also, any type of track or track-like structure could potentially be used to form the support rails 16.

Figure 2:
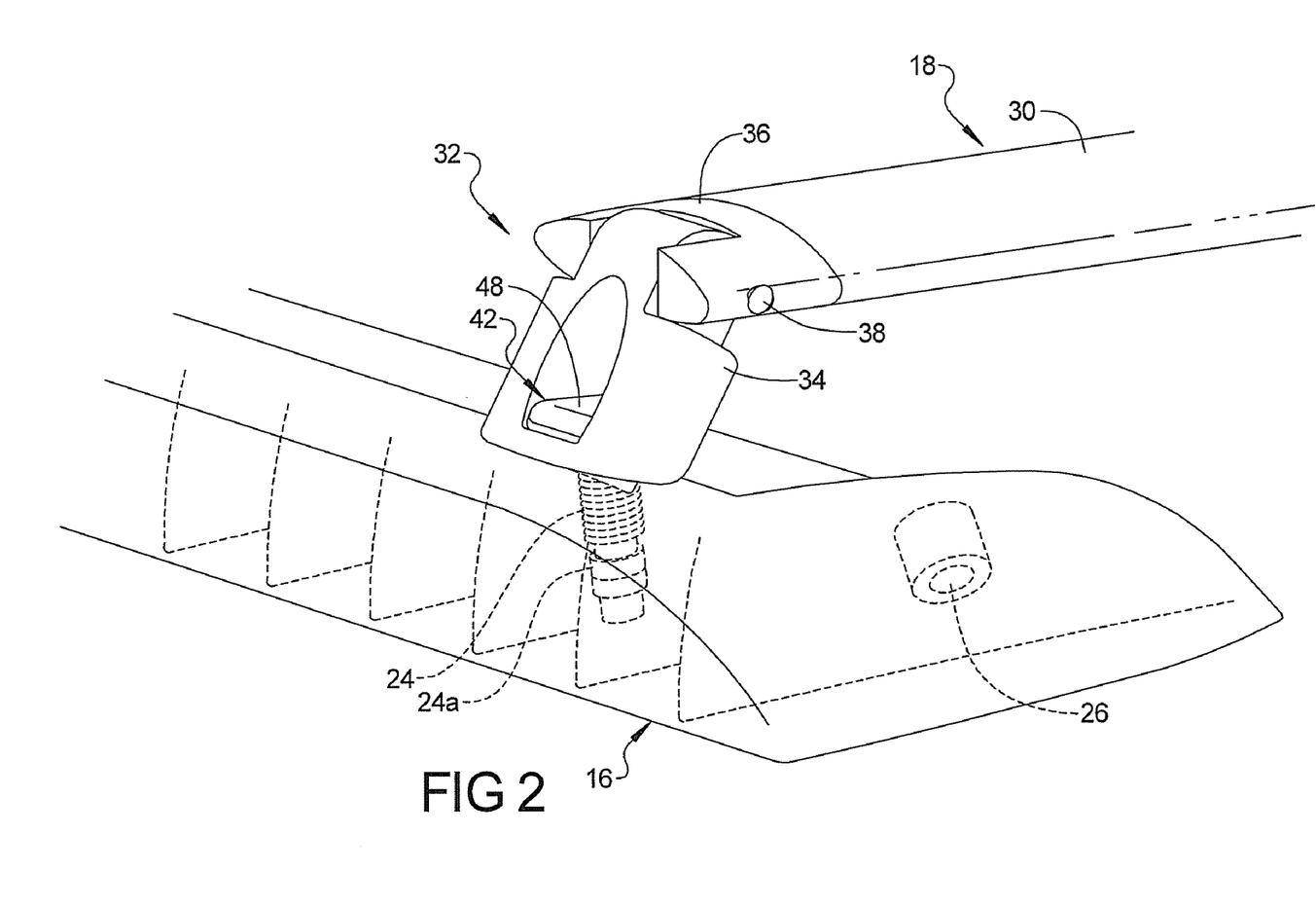
FIG. 2 is an enlarged perspective view of a portion of the vehicle article carrier of FIG. 1, with ones of the first and second attachment points being visible.

Referring further to FIG. 1, the support rails 16 each include a raised shoulder portion 20 and a recessed portion 22 extending along substantially a full length thereof. In FIG. 2 each support rail 16 has at least one first attachment point 24 and a pair of second attachment points 26. If two cross bars 18 are used with the system 10, then preferably a pair of first attachment points 24 will be incorporated. For the purpose of discussion it will be understood that a pair of cross bars 18 is used with the system 10. One pair of first attachment points 24 is arranged at opposite ends of each support rail 16. Similarly, one pair of second attachment points 26 is provided at the opposite ends of each of the support rails 16. Optionally but preferably, a plurality of additional first attachment points 24 are formed along each said support rail 16 that also enable each of the cross bars 18 to be secured at a plurality of different operative positions along the support rails 16 to better support variously sized and shaped articles thereon. The attachment points 24 are aligned so that at whatever longitudinal position along the support rails 16 the cross bars 18 are installed at for operation, the cross bars 18 will be extending generally perpendicularly between the support rails 16.

Referring to further to FIG. 2, one of the first attachment points 24 can be seen in greater detail. Each first attachment point 24 forms a threaded female bore that is aligned with an associated threaded fastening component 24a, such as a RIV-NUT™ fastener, fixedly secured in the outer body surface 14. Each second attachment point 26 forms a female threaded bore that is integrally formed in the support rail 16. Of course the second attachment point 26 could be formed by a metallic, press fit component having an internal threaded surface. Each first attachment point 26 will include an associated fastening component 24a aligned therewith and fixedly secured to the outer body surface 14. Thus, when the end supports 32 are attached at any pair of first attachments points 24, the cross bar 18 will be securely fastened to not only the support rails 16 but also to the outer body surface 14. This provides an extremely strong attachment arrangement for the cross bars 18.

In FIG. 2 the construction of one of the cross bars 18 can also be seen in greater detail. The cross bars 18 may be identical in construction, but they need not be. For convenience, it will be assumed that the cross bars 18 are identical in construction. The cross bar 18 shown in FIG. 2 includes a central portion 30 having an end support 32 at each opposite end thereof. The central portion 30 may form a tubular component made from a suitably strong material, for example aluminum or steel. The overall length of the cross bar 18 is sufficient to span the distance between the support rails 16 and is thus typically only slightly less than the overall width of the outer body surface 14 of the vehicle 12.

Each end support 32 includes a neck portion 34 that is hingedly secured to a base portion 36 via a pivot pin 38. This enables the neck portions 34 to hold the central portion 30 above the support rails 16 when the cross bar 18 is in its operative position shown in FIGS. 1 and 2. To accomplish this the neck portion 34 extends at an angle between about 20 degrees and 90 degrees relative to the outer body surface 14 of the vehicle 12, and more preferably between about 45 degrees and 75 degrees. The pivot pin 38 may be a splined pin that is press fit into the base portion 36 of the end support 32. The neck portion 34 may be secured to the central portion 30 of the cross bar 18 in conventional fashion by being inserted into a tubular end of the central portion 18 and being fastened thereto by threaded fasteners 39.

Figure 3:
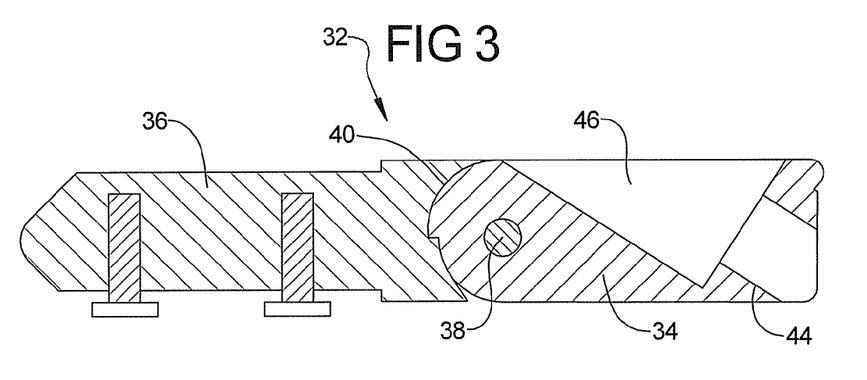
FIGS. 3 and 4 are partial cross sectional side views of one of the end supports illustrating the internal shoulder portion and internal wall portion that limit pivoting movement of the neck portion to a predetermined degree.
Figure 4:
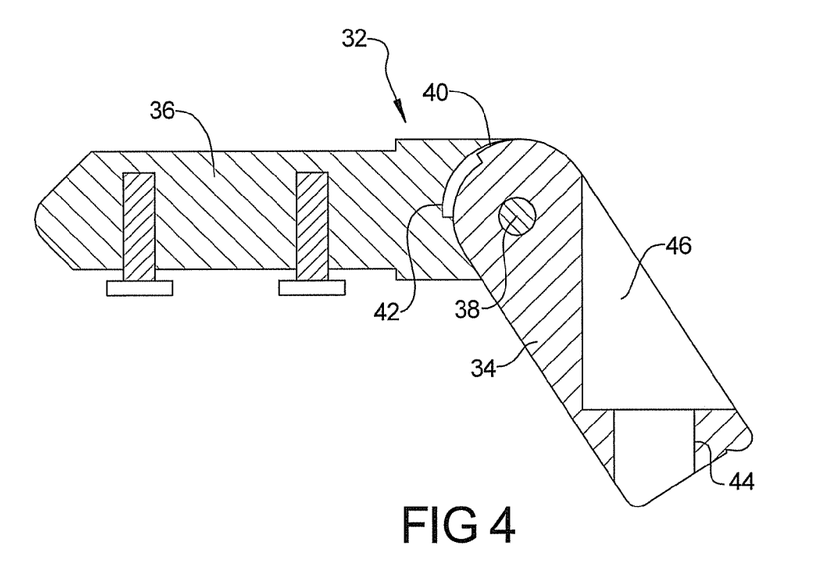

With further reference to FIGS. 3 and 4, the neck portion 34 can be seen to include an internal shoulder portion 40 that abuts an internal wall portion 41 of the base portion 36. This limits the pivoting motion of the neck portion 34 to a predetermined range and thus helps to provide rigidity to the cross bar 18 when the cross bar is in its operative position and supporting articles thereon.

With further reference to FIGS. 2, 3 and 4 the neck portion 34 also includes an attachment component in the form of a threaded male fastening element 42. The fastening element 42 extends through an opening 44 in a notched area 46 of the neck portion 34. The fastening element 42 can be secured in any one of the attachment points 24 or 26 to secure the end support 32 to a respective one of the support rails 16 in a stowed position or in an operative position. FIG. 2 shows the threaded fastening element 42 secured to one of the first attachment points 24. The threaded fastening element 42 may include a manually graspable wheel 48 that can be manually tightened and loosened by the fingers of one hand of the user, so that no external tools are required to remove and reposition the cross bar 18. Alternatively, the fastening element 42 may simply have a head portion with a slotted, Phillips, torx, etc. configuration that is loosened and tightened with a suitable tool.

Figure 5:
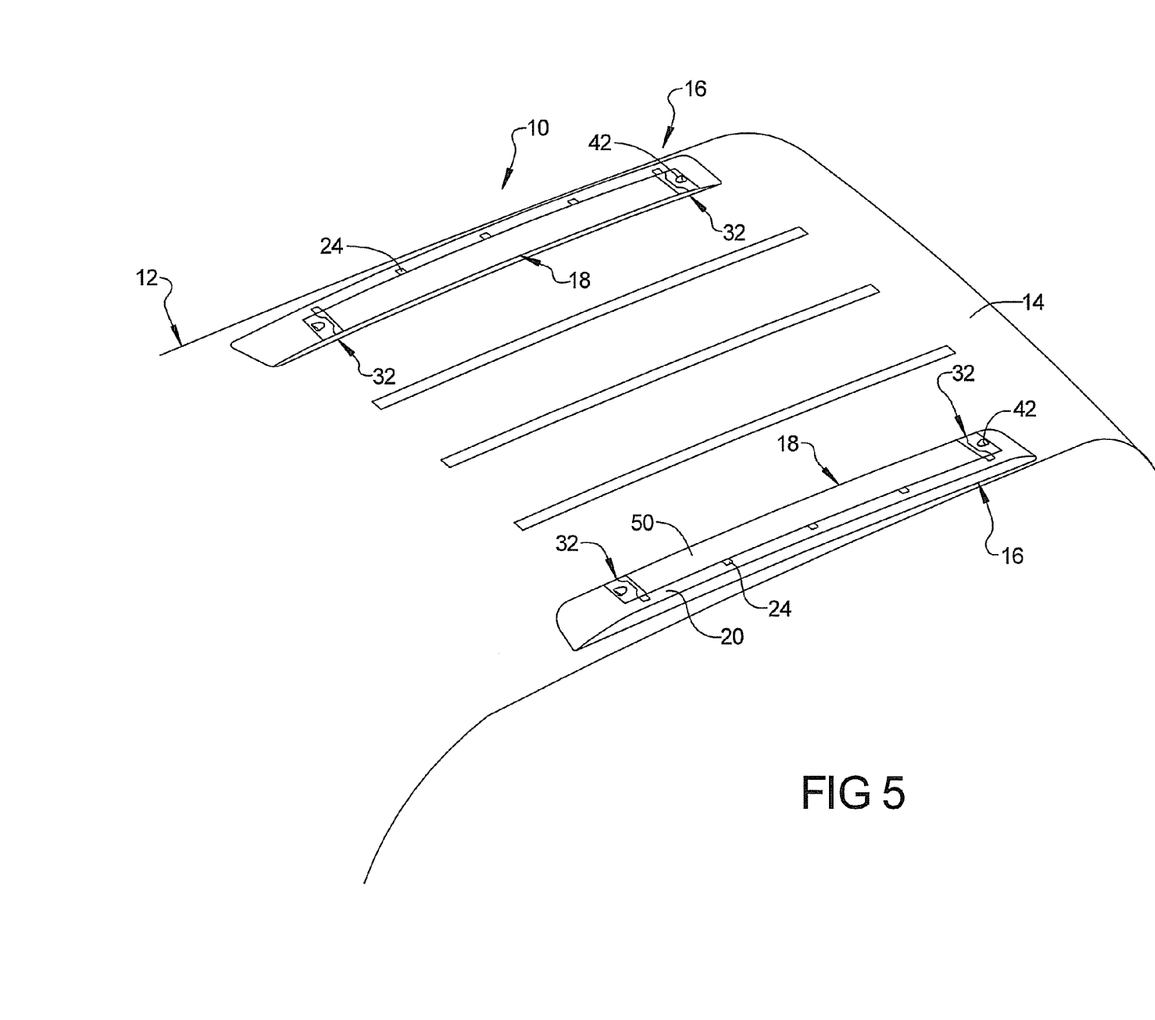
FIG. 5 is a view of the system of FIG. 1 but with both cross bars positioned in their stowed configurations.

Referring to FIG. 5 the cross bars 18 can be seen in their non-operative or "stowed" position. In the stowed position the threaded fastening element 42 is threadably engaged with the second pair of attachment points 26 at the opposite ends of the cross bar 18. In this configuration the cross bar 18 is essentially not visible from the side of the vehicle 12 and has an upper surface 50 that is substantially co-planar with the raised shoulder portion 20. This is because the neck portions 34 are able to pivot into position substantially in line with the central portion 30. Thus, when in its stowed position, the cross bar 18 provides no tangible aerodynamic drag during operation on the vehicle 12. The support rail 16 and the cross bar 18 essentially form a single, integrated and aesthetically pleasing assembly.

A particular feature that enables the neck portions 34 to lay flat and co-linear with the central portion 30 of the cross bar 18 is that the bores of the second attachment points 26 are formed at an angle to the outer body surface 14, as is visible in FIG. 2. In one embodiment this angle is between about 20-90 degrees, and more preferably between about 30 and 75 degrees.

Figure 6:
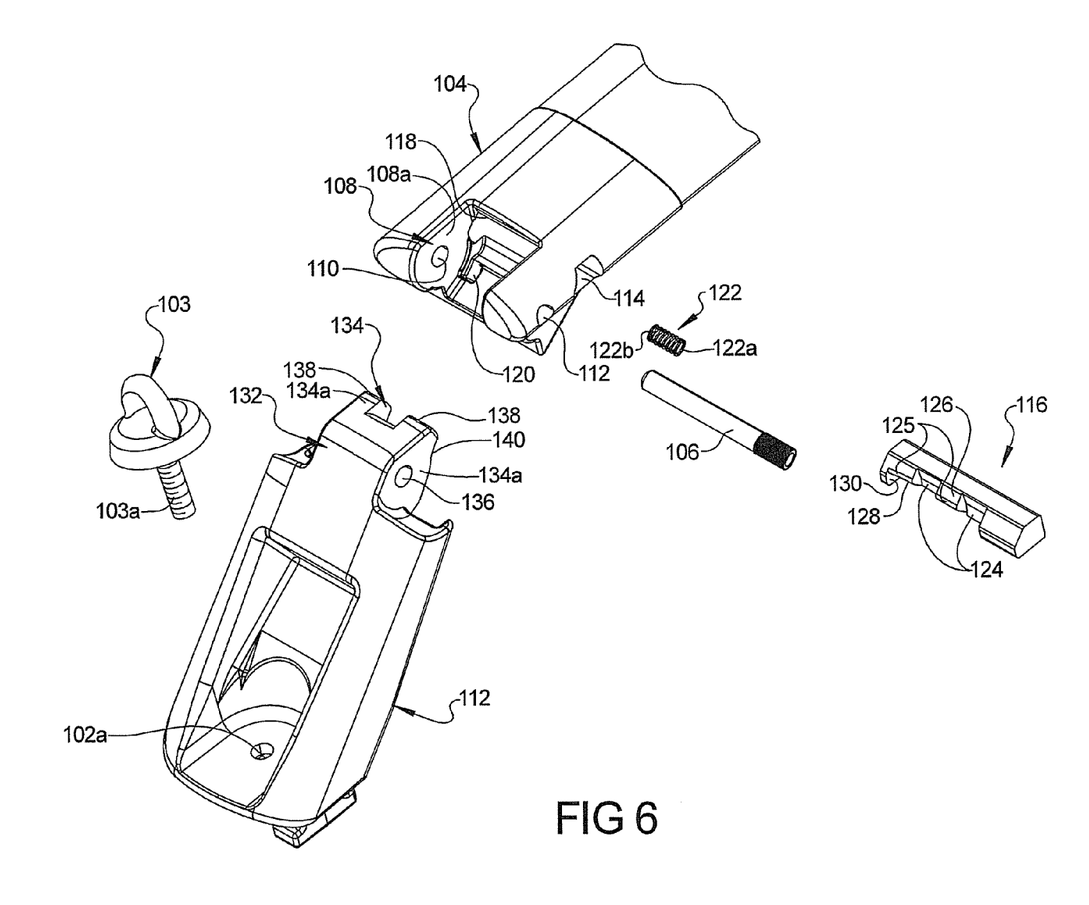
FIG. 6 is an exploded perspective view of another embodiment of the present disclosure illustrating another embodiment of the end support that may be used with the system and method of the present disclosure.
Figure 6A:
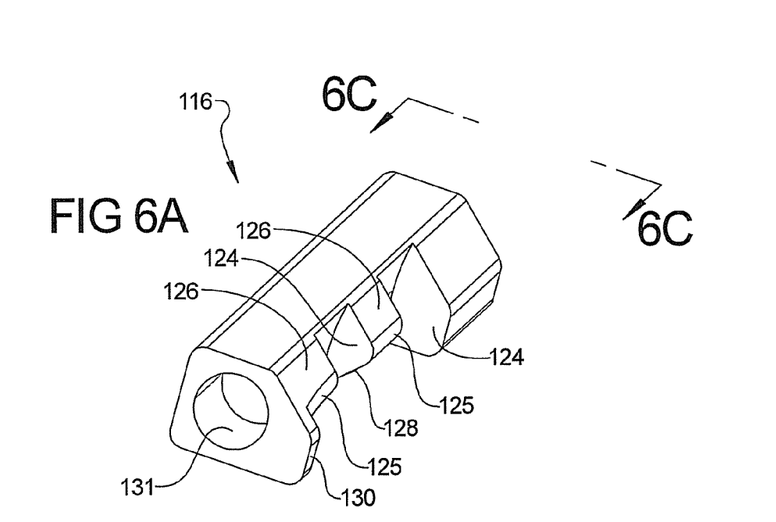
FIG. 6A is a perspective view of just the locking block of the end support.
Figures 6B, 6C:
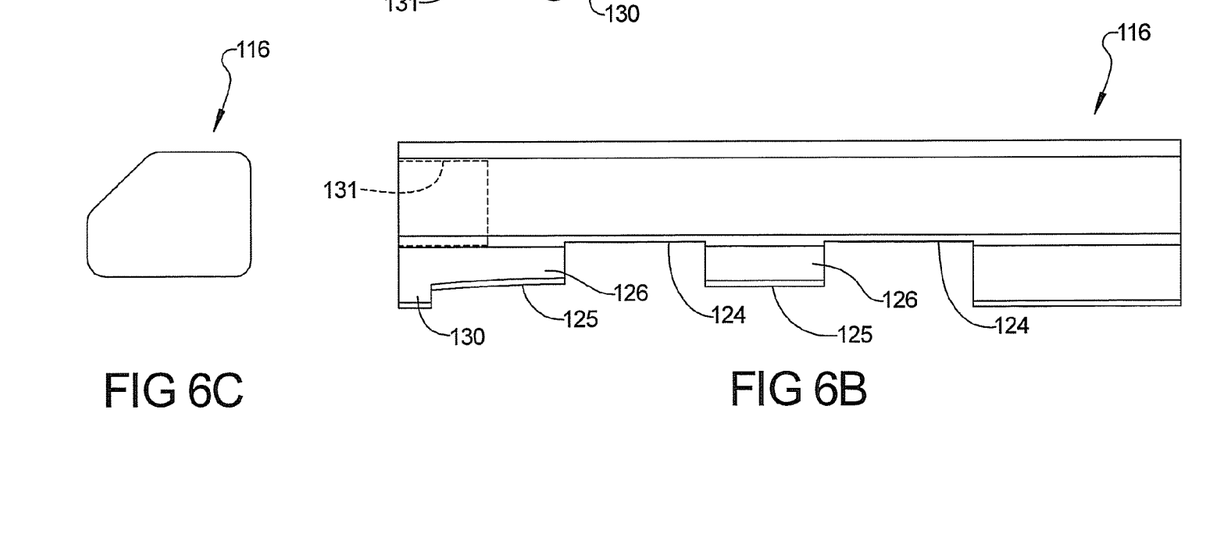
FIG. 6B is a plan view of the locking block of FIG. 6A.
FIG. 6C is an end view of the locking block of FIG. 6A taken in accordance with directional line 6C in FIG. 6A.

Referring to FIG. 6, another embodiment of the end support 100 is shown. The end support 100 includes a neck portion 102 and a base portion 104 that may be pivotally coupled via a knurled pivot pin 106. The base portion 104 includes a recessed portion 108 having aligned bores 110 and 112. The pivot pin 106 is of dimensions enabling it to be inserted through the bores 110 and 112 and maintained therein via a friction fit. The neck portion 102 may include a rotatable, threaded fastening element 103 having a threaded shaft 103a that may be positioned in a bore 102a of the neck portion 102 and threadably secured with any one of the attachment points 24 or 26.

The base portion 104 further includes a locking block bore 114 adapted to receive a locking block 116 therein. The locking block 116 is received in a rear area 118 of the recessed portion 108 that forms an angular surface generally complimentary to a portion of the locking block 116. A wall portion 120 limits rotational movement of the neck portion 102 so that the neck portion cannot be moved past a point where it is co-linear with the base portion 104 when the end support 100 is in its stowed position. This will be described in greater detail in the following paragraphs. A coil spring 122 or any other like, suitable biasing element is disposed in the rear area 118 and provides a biasing force against the locking block 116, as will be described in further detail in the following paragraphs.

Figure 10:
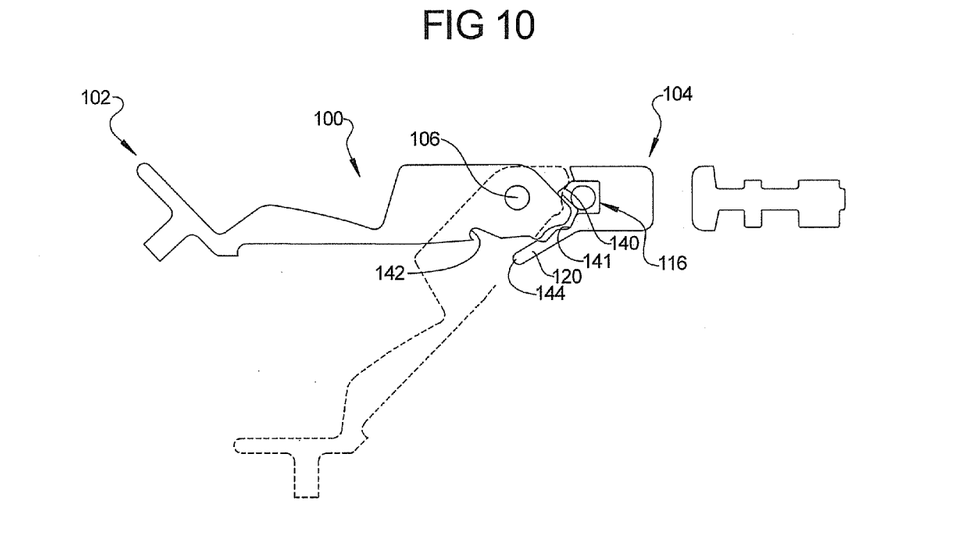
FIG. 10 is a simplified cross-sectional side view of the end support of FIG. 7 taken along section line 10-10 in FIG. 11, showing the orientation of the locking block when it is pressed into a position permitting rotational motion between the neck and base portions.

With further reference to FIGS. 6, 6A, 6B and 6C, the locking block 116 can be seen to include a pair of spaced apart cutouts 124 that help to define teeth 125. Each of the teeth 125 include an upper angled surface 126 and a lower angled surface 128 that converge to a point. The overall cross sectional shape of the locking block 116 approximately matches that of the locking block bore 114 so that when the locking block 116 is inserted into the bore 114, the locking block 116 cannot rotate, but can only slide laterally within the bore 114 a short, predetermined distance. The locking block 116 also includes a notched edge portion 130, visible in FIGS. 6B, 8 and 10, which prevents the locking block from falling out of the locking block bore 114 once the end support 100 is assembled. Essentially, notched edge portion 130 enables the locking block 116 to be captured in the base portion 104 when the neck portion 102 is assembled to the base portion 104. This feature will be described in further detail in the following paragraphs. A blind hole 131, visible in FIG. 6A, houses end 122a (visible in FIG. 6) of the spring 122, while the opposite end of the spring 122b abuts wall portion 108a in FIG. 6 when the locking block 116 is assembled in the base portion 104. The length of the spring 116, the depth of the blind hole 131 and the length of the locking block 116 are selected to allow a predetermined amount of lateral travel of the locking block 116, which in the embodiment shown is between about 0.125 inch and 0.75 inch, and more preferably about 0.5 inch. However, it will be appreciated that this length of travel is merely exemplary and can be varied considerably to meet personal preferences or specific application constraints or requirements.

Figure 7:
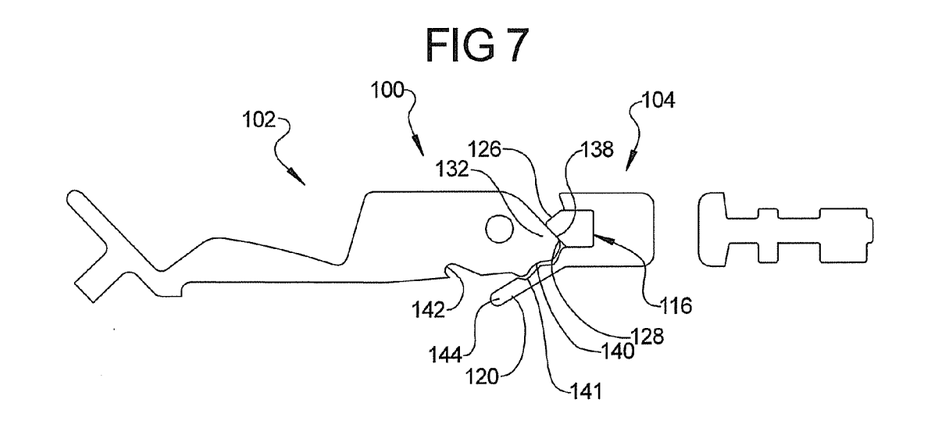
FIG. 7 is a simplified cross-sectional side view in accordance with section line 7-7 in FIG. 8 illustrating the end support locked in an operative position, with a locking block of the system preventing any pivoting movement between the neck and base portions of the end support.
Figure 8:
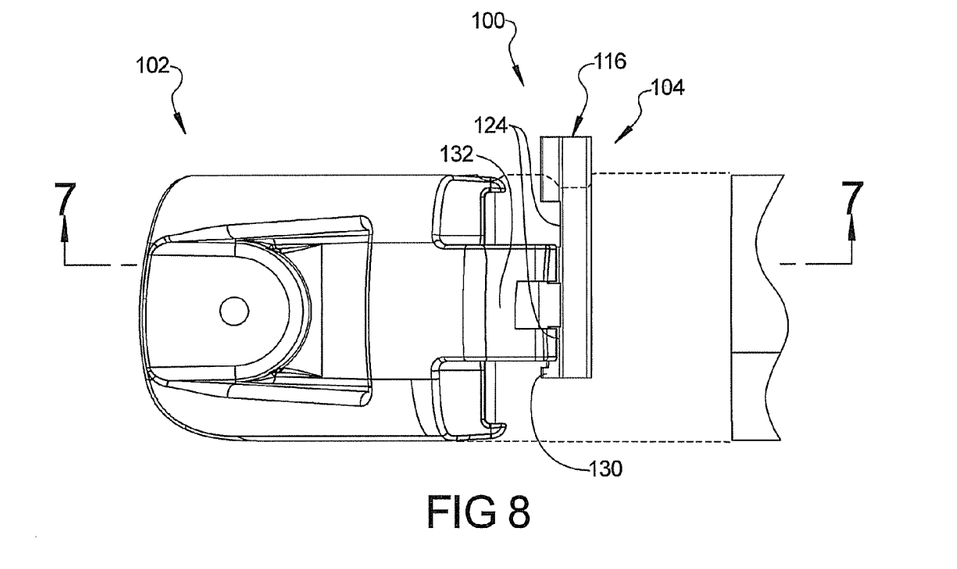
FIG. 8 is a partial plan view of the end support of FIG. 7 further illustrating the locking block in its stowed position.

Continuing to refer to FIGS. 6, 7 and 8, the neck portion 102 can be seen to include a projecting portion 132 having a pair of arms 134a. The overall width of the projecting portion 132 is such that it fits within the recessed portion 108 of the base portion 104. The width of each arm 134a is such that each may fit within the cutouts 124 in the locking block 116 when the locking block is fully depressed in the base portion 104 by a finger of a user. The projecting portion 132 also includes a bore 136 that receives the knurled pin 106 to maintain the neck portion 102 secured to the base portion, and to allow pivoting movement of the neck portion 102 relative to the base portion 104.

Referring to FIGS. 6, 7 and 8, the projecting portion 132 can be seen to include surfaces 138 (only one being visible) that engage with lower surfaces 128 of the teeth 125 of the locking block 116 when the neck portion 102 is in its stowed position (FIG. 7), and the locking block 116 is in its undepressed condition (as seen in FIG. 8). This prevents counter clockwise rotation of the neck portion 102. In this position a surface 140 of the projecting portion 132 also engages with a recess 141 of wall portion 120 to prevent clockwise rotational movement of the neck portion 102, as viewed in FIG. 7. Thus, the neck portion 102 is held against both clockwise and counterclockwise rotation, and is thus maintained in a substantially co-linear orientation with the base portion 104. This substantially or entirely eliminates any vibration or play between the neck portion 102 and base portion 104 when the vehicle on which the end support 100 is being used is moving, but while the system 10 is in not in use (i.e., in its stowed or inoperative position).

Figure 9:
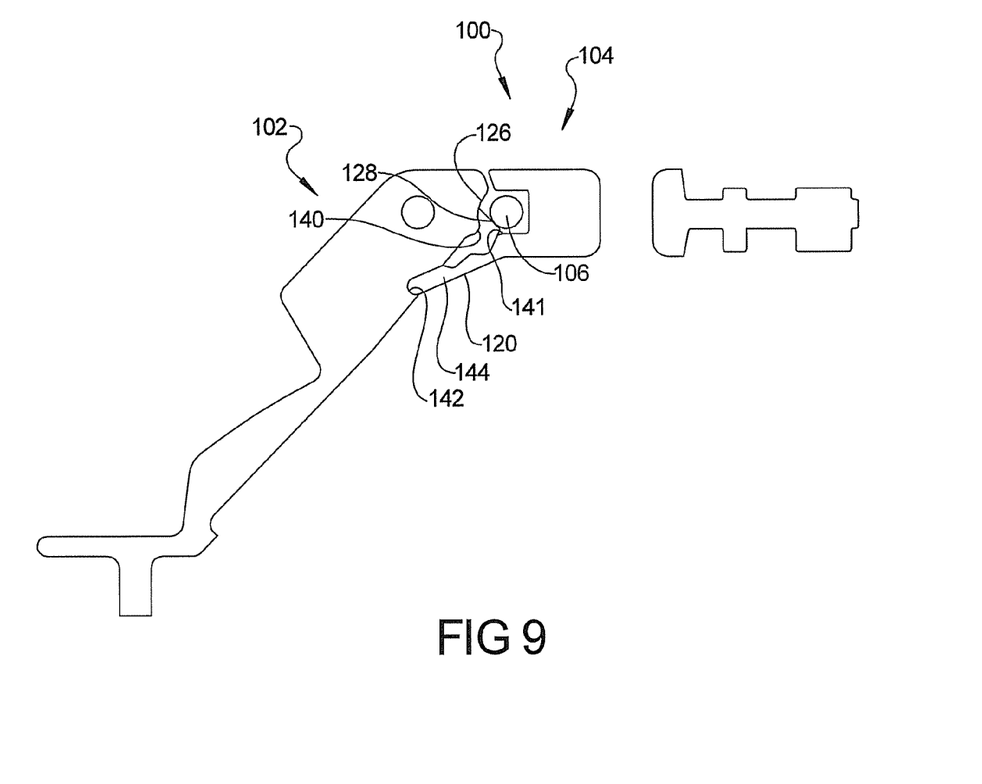
FIG. 9 is a partial cross-sectional side view of the neck portion and base portion, similar to that shown in FIG. 7, but with the neck portion in its operative position.

Referring further to FIGS. 6, and 9, the neck portion 102 is shown in its operative position. In this position a notched area 142 of the projecting portion 132 engages with a lip portion 144 of the wall portion 120 to prevent counterclockwise rotation of the base portion 102. The surface 140 now engages with the upper surfaces 126 of the teeth 125 of the locking block 116 when the locking block is in the position shown in FIG. 8 (i.e., undepressed), which prevents clockwise rotation of the neck portion 102. Thus, the neck portion 102 is also held against both clockwise and counterclockwise rotation when the locking block 116 is in the undepressed position shown in FIG. 8 and the neck portion 102 is in its operative position as shown in FIG. 9. This eliminates any significant wobble or play between the neck portion 102 and the base portion 104 while the end support 100 is being used to support articles above the outer body surface 14 (i.e., in its operative position).

Figure 11:
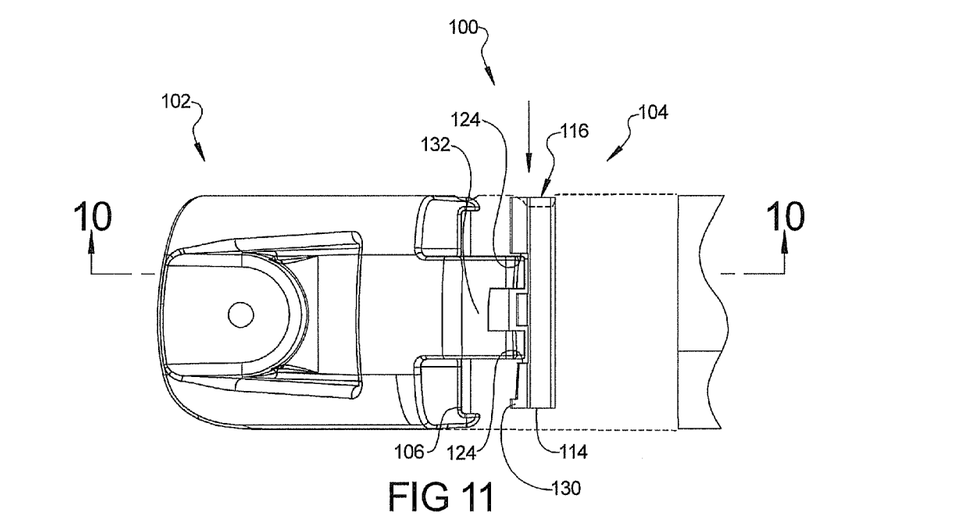
FIG. 11 is a partial plan view of the end support of FIG. 9 further illustrating the orientation of the locking block when it is pressed into the base portion to allow rotational movement between the neck and base portions.

When the locking block 116 is moved to its depressed position against the biasing force of the spring 122, as shown in FIG. 11, and held in this position by the user, the arm portions 134a of the projecting portion 132 of the neck portion 102 are aligned with the cutouts 124 of the locking block 116. Thus, the neck portion 102 is free to rotate along a limited arcuate path between its operative and stowed positions. Thus, to position the end support 100 in the desired position, the user simply depresses the locking block 116, positions and holds the neck portion 102 in the desired orientation (i.e., either operative or stowed), and then releases the locking block 116. Thereafter, the biasing force of the spring 122 pushes the locking block 116 back into its undepressed condition. This places the teeth 125 of the locking block 116 in lateral alignment (i.e., interfering alignment) with the arm portions 134a of the neck portion 102, and the teeth 125 of the locking block 116 will hold the neck portion 102 stationary relative to the base portion 104.

To assemble the end support 100 the spring 122 is first inserted in the locking block bore 114 and then the locking block 116 is inserted in the blind hole 131 of the locking block 116, and the locking block 116 is then slid through the bore 114 until the end 122b of spring 122 contacts the wall portion 108a. Further pressure is then applied to the locking block 116 so that the locking block is pushed into, and held, completely within the base portion 104, as shown in FIG. 11. Then while the locking block 116 is held fully depressed within the locking block bore 114, the projecting portion 132 of the neck portion 102 is inserted into the recess 108 of the base portion 104. The locking block 116 may then be released, and the biasing force of the spring 122 will push the locking block 116 out to the position shown in FIG. 8, with the projection 130 on the locking block 116 abutting a side surface of the one of the arm portions 134a of the projecting portion 132, as shown in FIG. 8. This prevents the locking block 116 from being pushed completely out of the bore 114 by the spring 122. At this point the neck portion 102 may be further articulated clockwise or counterclockwise slightly to align the bore 136 with the bores 110 and 112 of the base portion 104. While the neck portion 102 is held with the bores 136, 110 and 112 aligned, the pivot pin 106 may be press fit into the bore 110 and blind hole 112.

Figure 12:
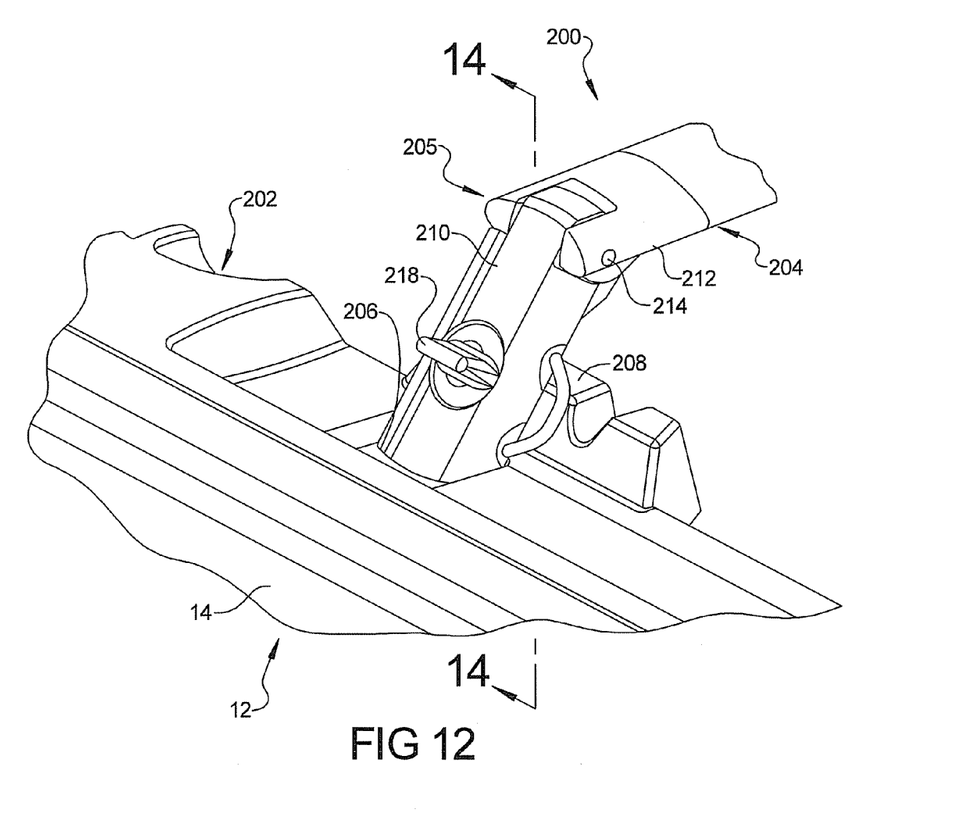
FIG. 12 is a perspective view of another embodiment of the present disclosure which includes a pod integrally formed with the support rail, and where the end supports of the cross bar include a securing mechanism adapted to couple a portion of the end support to the pod to provide even further enhanced structural rigidity to the cross bar when it is in its operative position.
Figure 13:
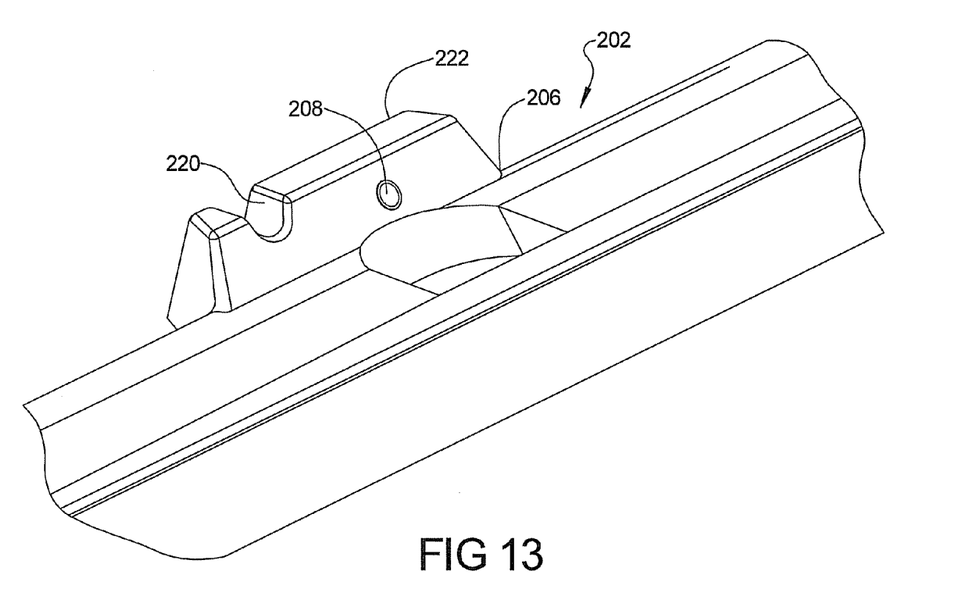
FIG. 13 is a perspective view of a portion of just the support rail of the system shown in FIG. 12.
Figure 14:
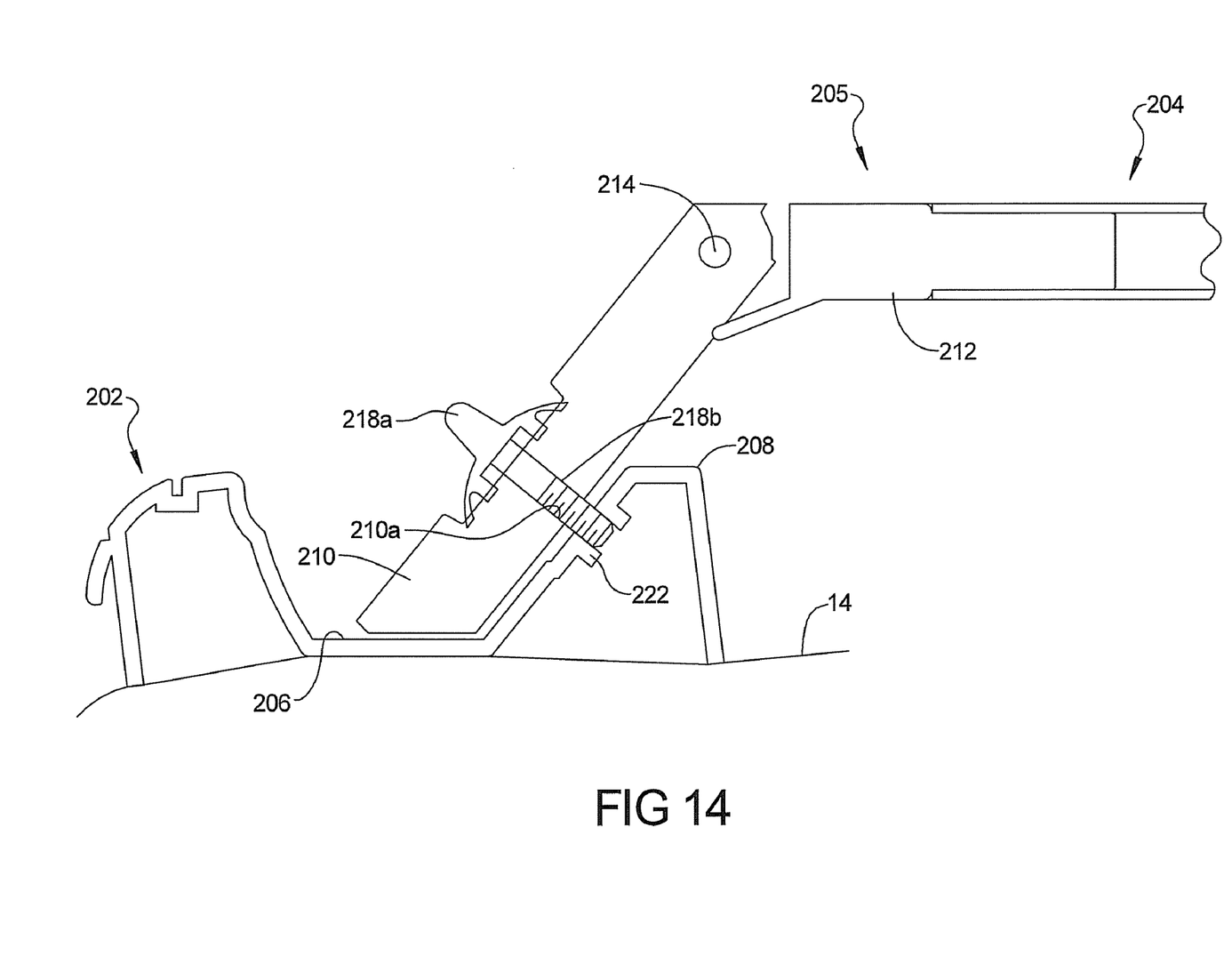
FIG. 14 is a cross sectional view of the end support shown in FIG. 12 attached to the support rail, taken in accordance with section line 14-14 in FIG. 12.

Referring now to FIGS. 12 through 14, another embodiment of a vehicle article carrier system 200 in accordance with the present disclosure is shown. The system 200 is somewhat similar to system 10 in that a support rail 202 is provided that may support a cross bar 204 thereon in either a stowed orientation, as described in connection with system 10, or in an operative position. In the stowed position the cross bar 204 may be secured to a second attachment point (not shown) on the support rail 202, such as described and shown for system 10, so that it rests on the support rail 202 along the longitudinal axis of the support rail, as described above for support rails 16 and cross bars 18 shown in FIG. 1. In the operative position the cross bar 204 may be used to support articles or widely varying sizes and shapes above the outer body surface 14 of the vehicle 12. It will also be appreciated that while only a single support rail 202 and a single cross bar 204 have been shown, that the system 200 may employ a pair of identical support rails 202 and a pair of cross bars 204, which may be identical or even slightly different in construction. The support rails 202 may be secured to the outer body surface 14 by RIVNUT® style fasteners or any other suitable fastening means.

With continuing reference to FIG. 12, the support rail 202 can be seen include a pocket 206 adjacent a protruding pod 208. The cross bar 204 may include an end support 205 having a neck portion 210 and a base portion 212 that are pivotally coupled to one another by a pivot pin 214. The base portion 212 is fixedly secured to a central portion 216. The central portion 216 of the cross bar 204 is elevated above the outer body surface 14 and supports articles thereon when the cross bar 204 is in use.

The neck portion 210 includes a user graspable fastening component 218 that may be rotated by the user grasping it with two or more fingers and rotating it, in this example clockwise. When the cross bar 204 is positioned in its stowed orientation, this allows the cross bar 204 to be securing retained to its associated support rail 202. When the cross bar 204 is in its operative orientation, with the neck portion 210 resting in the pocket 206 and leaning against the pod 208, the neck portion may be secured to the pod 208. The pod 208 provides the advantage of even further stabilizing the end support 205 against movement in both a longitudinal direction, that is, a direction parallel to the longitudinal axis of the support rail 202, as well as stabilizing the end support 205 against lateral movement (i.e., movement perpendicular to the longitudinal axis of the support rail 202).

Referring to FIGS. 12 and 13, the pocket 206 and the pod 208 can be seen in greater detail. The pod 208 is integrally formed with the support rail 202 and includes a recessed portion 220 having an opening (not visible). The opening allows a stud secured to the vehicle outer body surface 14 to project through a portion of the support rail 202 so that the support rail can be fixedly secured to the outer body surface 14. The recessed portion 220 allows room for a threaded nut or other form of retaining element to be positioned therein so as not to be visible when the support rail 202 is secured to the outer body surface 14. The pod 208 also includes a threaded insert 222 adapted to receive a threaded portion of the user engageable fastening component 218. The threaded insert 222 thus forms the first attachment point for the cross bar 204.

Referring to FIG. 14, a cross sectional view of the cross bar 204 secured in its operative position to the support rail 202 is shown. The user engageable actuating member 218 includes a dial-like element 218a that the user may grasp, as well as a threaded shaft 218b that extends through a bore 210a in the neck portion 210. The threaded shaft 218b may be retained in the neck portion 210 in any conventional manner, so that it cannot be removed from the neck portion 210. The threaded shaft 218b engages with the threaded insert in the pod 222 to hold the neck portion 210 securely to the pod 208.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for use on an outer body surface of a vehicle to removably support articles above the outer body surface, the system comprising:
   a pair of support rails adapted to be secured to the outer body surface generally parallel to one another, and extending along a major longitudinal axis of the vehicle;
   said support rails each including a plurality of attachment points;
   at least one cross bar having dimensions sufficient to extend between the support rails when the support rails are secured to the outer body surface of the vehicle;
   said cross bar having:
      a central portion;
      a pair of end supports at opposite ends of said central portion;
      each said end support having a portion that is hingedly secured to its respective end of said central portion and moveable between a first position substantially parallel with said central portion, and a second position extending non-parallel to said central portion;
      each said end support including an attachment component adapted to extend into specific ones of said plurality of attachment points of said support rails when said cross bar is in an operative position extending generally perpendicularly between said support rails, and such that said central portion is elevated above said end supports; and
      said attachment components of said end supports of said cross bar adapted to engage an associated one of said support rails when said cross bar is in a non-operative position, such that said cross bar is stowed closely against and generally parallel to said associated support rail.

2. The vehicle article carrier of claim 1, wherein said one support rail includes a recessed portion within which said cross bar is positioned when said cross bar is secured to said one support rail in said stowed position.

3. The vehicle article carrier of claim 1, wherein said attachment component of each said end support includes a manually engageable locking component that enables a user to manually engage and disengage said attachment component from said plurality of attachment points.

4. The vehicle article carrier of claim 3, wherein said manually engageable locking component comprises a member graspable with the fingers of one hand.

5. The vehicle article carrier of claim 4, wherein said attachment component comprises a threaded male member and each of said plurality of attachment points includes an opening in line with a threaded female component that is fixedly secured to the outer body surface.

6. The vehicle article carrier of claim 5, wherein each said end support is adapted to be secured at specific ones of said plurality of attachment points such that said end supports extend at an angle between about 20 degrees and 90 degrees relative to said central portion of said cross bar, to thus position said central portion at an elevated position above said support rails.

7. The vehicle article carrier of claim 6, wherein each said end support is secured at specific ones of said plurality of attachment points such that said end supports each extend at an angle of between about 45 degrees and 75 degrees.

8. The vehicle article carrier of claim 1, wherein other specific ones of said plurality of attachment points of each said support rail form openings that extend at an angle of between about 20 degrees to about 70 degrees relative to said outer body surface of said vehicle.

9. The vehicle article carrier of claim 1, wherein each said end support includes structure preventing it from rotating beyond an angle of about 80 degrees relative to said outer body surface of said vehicle when said cross bar is secured to said support rails at specific ones of said plurality of attachment points.

10. The vehicle article carrier of claim 1, wherein:
   each of the support rails includes an outwardly projecting pod, and wherein specific ones of said plurality of attachment points are located on the pod of each of the support rails; and
   each of the support rails includes a pocket for receiving said hingedly secured portion of said end support therein, said pocket being located adjacent said pod.

11. The vehicle article carrier of claim 1, wherein each said end support further comprises a locking block moveable by a user from a first position, in which said locking block limits angular movement of said portion of said end support when said end support is in either of said operative or stowed positions, to a second position in which angular movement of said portion of said end support is enabled.

12. The vehicle article carrier of claim 11, further comprising a biasing element for biasing said locking block into said first position.

13. A vehicle article carrier system for use on an outer body surface of a vehicle to removably support articles above the outer body surface, the system comprising:
   a pair of support rails adapted to be secured to the outer body surface generally parallel to one another, and extending along a major longitudinal axis of the vehicle;

said support rails each including a first attachment point and a pair of second attachment points;

at least one cross bar having dimensions sufficient to extend between the support rails when the support rails are secured to the outer body surface of the vehicle;

said cross bar having:

a central portion;

a pair of end supports at opposite ends of said central portion;

each said end support being hingedly secured to its respective end of said central portion and moveable between a first position substantially parallel with said central portion, and a second position extending non-parallel to said central portion such that said central portion is elevated above said end supports;

each said end support including an attachment component adapted to engage at said first attachment points of said support rails when said cross bar is in an operative position extending generally perpendicularly between said support rails, said end supports further extending at an angle of between about 30 degrees to about 90 degrees when said cross bar is positioned in said operative position; and said attachment components of said cross bar adapted to engage at said pair of second attachment points on one of said support rails when in a non-operative position so as to be stowed closely against and generally parallel to said one support rail, and said end supports being generally coplanar with said central portion of said cross bar when said cross bar is in said non-operative position.

14. The vehicle article carrier of claim 13, wherein said one support rail includes a recessed portion within which said cross bar is positioned when said cross bar is secured to said one support rail in said non-operative position.

15. The vehicle article carrier of claim 13, wherein said attachment component of each said end support includes a manually engageable locking component that enables a user to manually engage and disengage said attachment component from said first and second attachment points.

16. The vehicle article carrier of claim 15, wherein said manually engageable locking component comprises a member graspable with the fingers of one hand.

17. The vehicle article carrier of claim 16, wherein said attachment component includes a first threaded male member and each of said attachment points includes a female threaded portion.

18. The vehicle article carrier of claim 13, wherein said second attachment points of each said support rail form openings that extend at an angle of between about 20 degrees to about 70 degrees relative to said outer body surface of said vehicle.

19. A vehicle article carrier system for use on an outer body surface of a vehicle to removably support articles above the outer body surface, the system comprising:

a pair of support rails adapted to be secured to the outer body surface generally parallel to one another, and extending along a major longitudinal axis of the vehicle;

said support rails each including a first attachment point and a pair of second attachment points;

at least one cross bar having dimensions sufficient to extend between the support rails when the support rails are secured to the outer body surface of the vehicle;

said cross bar having:

a central portion;

a pair of end supports at opposite ends of said central portion;

each said end support including an attachment component adapted to engage at any of said first and second attachment points;

each said end support being hingedly secured to its respective end of said central portion and moveable so as to position said central portion of said cross bar at an elevated position above said end supports when said attachment components are secured at said first attachment points of said pair of support rails, such that said cross bar is in an operative position; and each said attachment component of each said end support being securable at said second attachment points of one of said support rails to place said central portion and said end supports generally flush against said one support rail in a stowed, non-operative position when said cross bar is not needed for use.

20. The vehicle article carrier of claim 19, wherein said end supports extend at an angle of between about 30 degrees to about 90 degrees when said cross bar is positioned in said operative position on said support rails.

21. The vehicle article carrier of claim 19, wherein:

said attachment component of each said end support includes a manually engageable locking component that enables a user to manually engage and disengage said attachment component from said first and second attachment points without the use of an external tool;

said manually engageable locking component comprises a member graspable with the fingers of one hand;

said end support includes a raised shoulder portion and a recess adjacent the raised shoulder portion; and said cross bar is positioned within said recess when in said non-operative position.

22. The vehicle article carrier of claim 19, wherein:

each of the support rails includes an outwardly projecting pod, and wherein the first attachment point is located on the pod of each of the support rails; and each of the support rails includes a pocket for receiving said hingedly secured portion of said end support therein, said pocket being located adjacent said pod.

23. The vehicle article carrier of claim 19, wherein:

each said end support further comprises a neck portion and a base portion, where the neck portion is moveable pivotally relative to the base portion;

a linearly moveable locking block housed within each said end support, the locking block being moveable by a user from a first position, in which said locking block limits angular movement of said neck portion relative to said base portion when said end support is in either of said operative or stowed positions, to a second position in which angular movement of said neck relative to said base portion of said end support is enabled; and a biasing element housed within each said end support for biasing said locking block into said first position.

* * * * *